United States Patent
Hendsbee et al.

(10) Patent No.: US 8,464,045 B2
(45) Date of Patent: Jun. 11, 2013

(54) DISTRIBUTED DIGITAL CERTIFICATE VALIDATION METHOD AND SYSTEM

(75) Inventors: Peter J. Hendsbee, Waterloo (CA); Andrew R. Blaikie, Waterloo (CA); Gene R. Franklin, Waterloo (CA); Jeewhoon Park, Mississauga (CA); Ajay Mulani, Mumbai (IN)

(73) Assignee: NCR Corporation, Duluth, GA (US)

( * ) Notice: Subject to any disclaimer, the term of this patent is extended or adjusted under 35 U.S.C. 154(b) by 985 days.

(21) Appl. No.: 11/986,254

(22) Filed: Nov. 20, 2007

(65) Prior Publication Data

US 2009/0132810 A1 May 21, 2009

(51) Int. Cl.
*H04L 29/06* (2006.01)

(52) U.S. Cl.
USPC .......................................... 713/156; 713/176

(58) Field of Classification Search
USPC .......................... 713/155–159, 173, 175–176
See application file for complete search history.

(56) References Cited

U.S. PATENT DOCUMENTS

| | | | | |
|---|---|---|---|---|
| 5,903,851 | A * | 5/1999 | Backstrom et al. | 455/557 |
| 6,393,420 | B1 * | 5/2002 | Peters | 1/1 |
| 2002/0184182 | A1 * | 12/2002 | Kwan | 707/1 |
| 2003/0204742 | A1 * | 10/2003 | Gupta et al. | 713/200 |
| 2003/0237004 | A1 * | 12/2003 | Okamura | 713/201 |
| 2004/0030888 | A1 * | 2/2004 | Roh et al. | 713/156 |
| 2004/0111609 | A1 * | 6/2004 | Kaji et al. | 713/156 |
| 2005/0228999 | A1 * | 10/2005 | Jerdonek et al. | 713/176 |
| 2006/0041943 | A1 * | 2/2006 | Singer et al. | 726/27 |
| 2006/0077946 | A1 * | 4/2006 | Adya et al. | 370/349 |
| 2006/0277417 | A1 * | 12/2006 | Oikawa et al. | 713/193 |
| 2007/0143596 | A1 * | 6/2007 | Myers et al. | 713/156 |
| 2008/0086634 | A1 * | 4/2008 | Salowey et al. | 713/156 |
| 2009/0019280 | A1 * | 1/2009 | Blaikie et al. | 713/158 |

* cited by examiner

*Primary Examiner* — Hadi Armouche
(74) *Attorney, Agent, or Firm* — Peter H. Priest

(57) ABSTRACT

A distributed digital certificate validation method of a client connectable in communication with a host is provided. A first connection is made with the host to establish data communication with the host. A request for a certificate validation result is sent to the host. A file containing at least the requested certificate validation result is imported from the host and the imported file is stored locally for later retrieval of at least the requested certificate validation result.

8 Claims, 3 Drawing Sheets ical known digital certificate validation method, a
DISTRIBUTED DIGITAL CERTIFICATE VALIDATION METHOD AND SYSTEM

BACKGROUND

The present invention relates to digital certificates, and is particularly directed to a distributed digital certificate validation method and system.

In a typical known digital certificate validation method, a certificate validation service runs on a host which is centrally located relative to a number of clients. Each client operates independently of the host. When needed, each client can connect on-line to the host to obtain certificate validation results in real-time.

A drawback in known digital certificate validation methods is that the client needs to connect and communicate with the host each time the client needs to validate a certificate. Since the client operates independently of the host and usually has limited resources, it may be quite inefficient for the client to make the connection and communicate with the host each time a certificate validation result is needed. It would be desirable to provide a more efficient digital certificate validation method and system.

SUMMARY

In accordance with one embodiment of the present invention, a distributed digital certificate validation method of a client connectable in communication with a host comprises making a first connection with the host to establish data communication with the host, sending to the host a request for a certificate validation result, importing from the host a file containing at least the requested certificate validation result, and storing the imported file locally for later retrieval of at least the requested certificate validation result.

DETAILED DESCRIPTION

Figure 1:
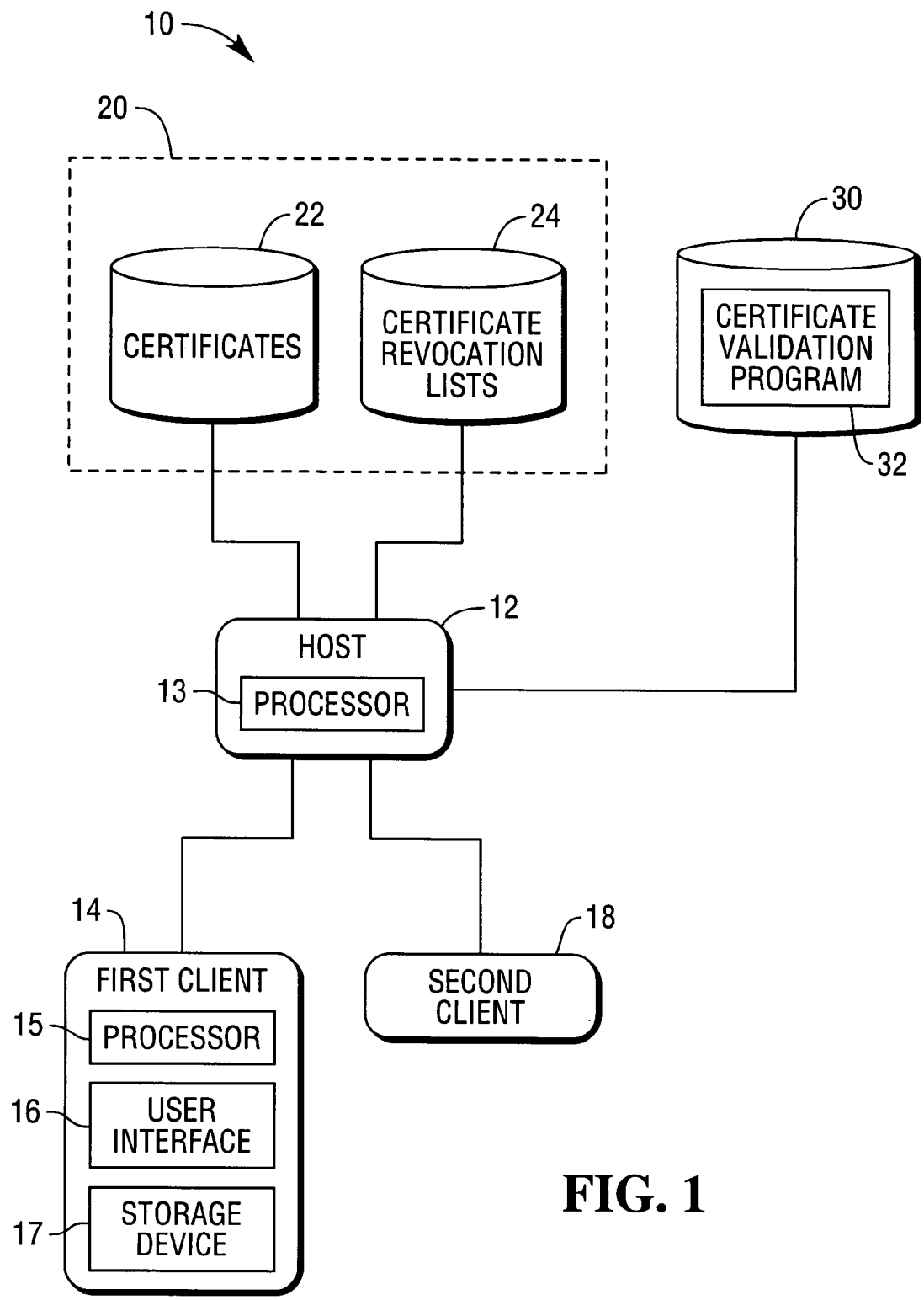
FIG. 1 is a schematic block diagram of a distributed digital certificate validation system embodying the present invention.

The present invention relates to digital certificates, and is particularly directed to a distributed digital certificate validation method and system. A distributed digital certificate validation system 10 is illustrated in FIG. 1. The system 10 comprises a host 12 which communicates with a first client 14 and a second client 18. The host 12 includes a processor 13 which accesses data from a database 20, and executes application programs stored in a program store 30.

The database 20 includes a first data store 22 which stores digital certificates. The digital certificate preferably meets the Internet X.509 PKI ("public key infrastructure") profile which is known. Such a digital certificate has required field attributes. Required field attributes include Version, Serial Number, Signature, Issuer, Validity, Subject, Subject Public Key Info, AKI Key Identifier, SKI, Basic Constraints, and Key Usage. Each certificate is uniquely identifiable by the combination of the field attribute values of Issuer and Serial Number.

The database 20 further includes a second data store 24 which stores certificate revocation lists (CRLs). A CRL is issued by a certificate authority (CA). A CRL contains information about digital certificates which have been placed on hold. A CRL also contains information about digital certificates which have been revoked. CRLs and the information contained therein are known and, therefore, will not be described. The CRLs also preferably meet the Internet X.509 PKI profile. Such a CRL has required field attributes. Required field attributes include Version, Signature, Issuer, This Update, and Next Update. Each CRL is uniquely identifiable by the combination of either the field attribute values of Issuer and This Update or the field attribute values of Issuer and CRL Number.

The program store 30 contains a number of application programs. More specifically, the program store 30 contains an executable certificate validation program 32 which, when executed, provides certificate validation results. The certificate validation program 32 may comprise a typical known algorithm for validating digital certificates.

The first client 14 and the second client 18 may be substantially the same. For simplicity, only the first client 14 will be described. The first client 14 includes a processor 15 and a user interface 16 having typical input and output devices which allow a human operator to make a request to validate a digital certificate. The first client 14 further includes a storage device 17 which is local to the first client. When a human operator desires to validate a digital certificate, the operator interacts via the user interface 16 to make a request to validate the digital certificate. In response to the request, the client processor 15 communicates with the host processor 13 which, in turn, invokes the certificate validation program 32 to validate the digital certificate in a known manner.

Figure 2:
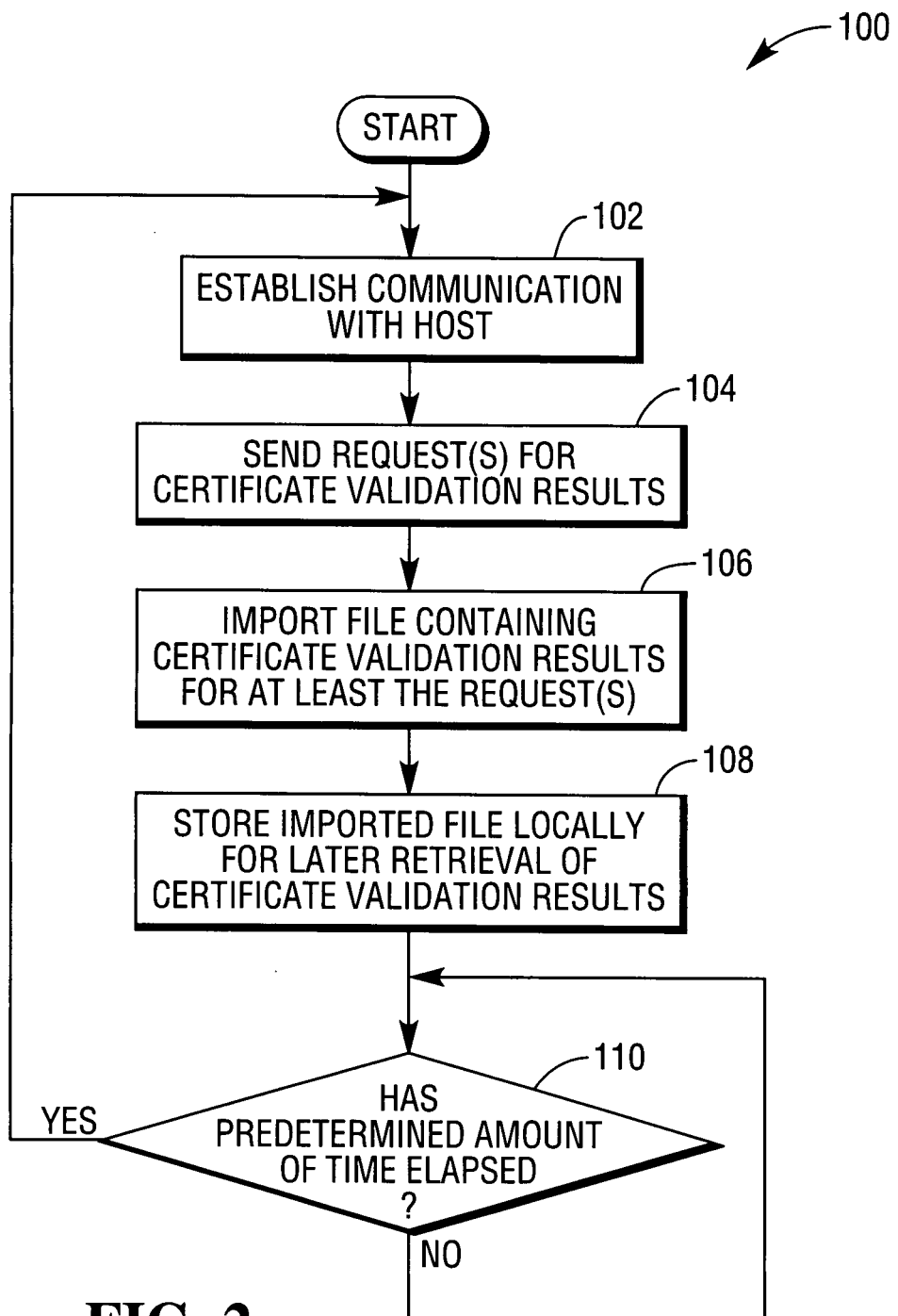
FIG. 2 is a flowchart depicting a distributed digital certificate validation method embodying the present invention.

Referring to FIG. 2, a flowchart 100 depicts operation of a distributed digital certificate validation method of the client processor 15 in response to the operator making a request to validate a digital certificate. When the operator desires to make a request to validate a digital certificate, the operator takes the necessary steps to establish communication between the client processor 15 and the host processor 13 (step 102). The operator then sends a request to the host 12 to obtain certificate validation results (step 104). This may be a single request or a multiple number of different requests.

After the host 12 generates the certificate validation results (as will be described later with reference to the flowchart 200 shown in FIG. 3), the first client 14 imports the generated certificate validation results from the host (step 106). The format of the imported results may be of any type. For example, the format of the imported file containing the certificate validation results may be a file transfer protocol (FTP) type of file.

The first client 14 then stores the imported certificate validation results in the local storage device 17. The certificate validation results stored in the local storage device 17 can be later retrieved by the client processor 15 without having to first connect and establish communication with the host processor 13. For example, the operator at the first client 14 may decide at a later time to request certificate validation results for a particular digital certificate.

After the imported certificate validation results have been stored locally in the storage device 17, a determination is made at the first client 14 as to whether a predetermined amount of time has elapsed since the last file containing certificate validation results has been imported from the host 12 (step 110). As an example, the predetermined amount of time elapsed may comprise the amount of time in a regular business day. If the determination in step 110 is affirmative (i.e., the predetermined amount of time has elapsed), then the process returns to step 102 so that the client processor 15 can again establish communication with the host processor 13 to repeat the process just described hereinabove to update the certificate validation results stored locally at the storage device 17. However, if the determination in step 110 is negative, the process loops back on itself in step 110 until the predetermined amount of time has elapsed.

Figure 3:
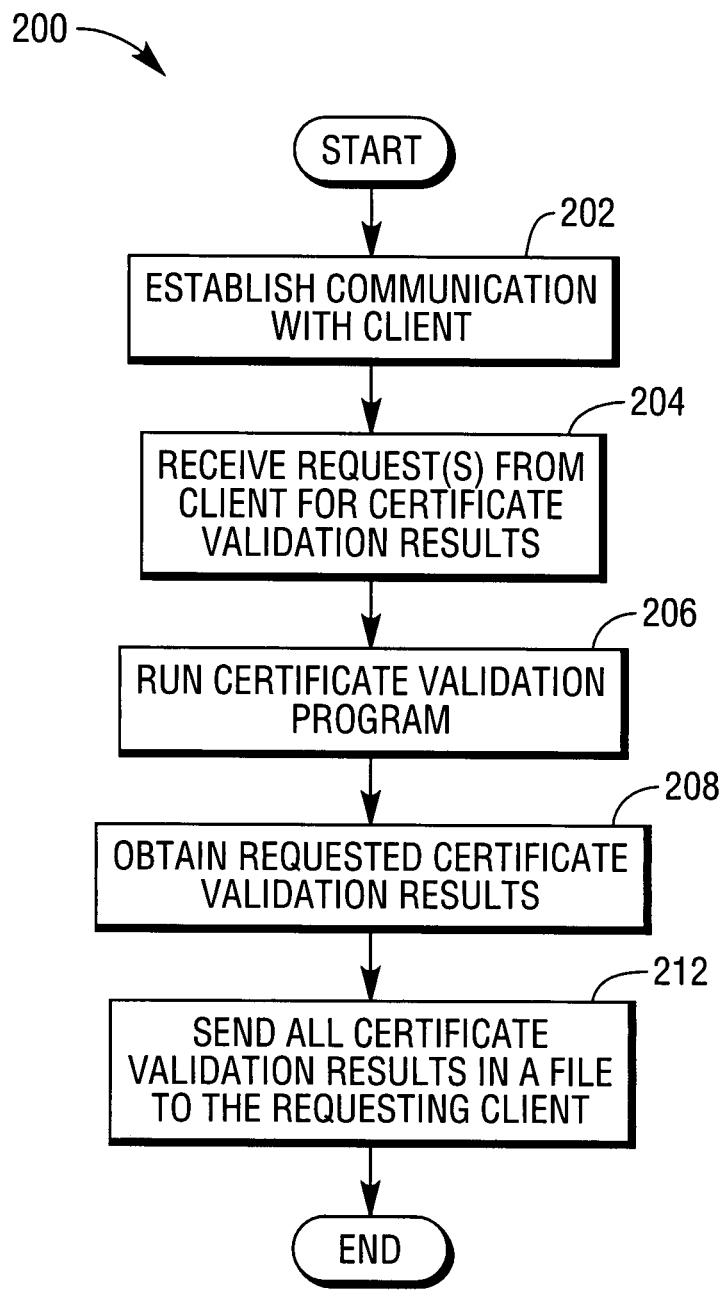
FIG. 3 is a flowchart depicting another distributed digital certificate validation method embodying the present invention.

Referring to FIG. 3, a flowchart 200 depicts operation of a distributed digital certificate validation method of the host processor 13 in response to the client processor 15 making connection and communicating with the host processor to validate a digital certificate. After communication is established between the client processor 15 and the host processor 13 (step 202), the host processor receives a one or more requests from the client processor for certificate validation results (step 204). The host processor 13 then executes the certificate validation program 32 (step 206) to obtain certificate validation results corresponding to the specific requests which have been made. The certificate validation results obtained in step 208 are then transmitted in a file to the client processor 15 for storage in the storage device 17 local to the first client 14 (step 212).

From the processes 100 and 200 described hereinabove, it should be apparent that the host 12 is "pre-validating" certificates and providing validation results along with the certificates in a file which can be imported by the first client 14. This file containing validation results may be called a "pre-validation file". When the first client 14 needs to validate certificates, the certificates and their validation results can be retrieved from the locally-stored pre-validation file.

It should also be apparent that the client processor 15 need not be continuously connected in communication with the host processor 13 to allow a request for a certificate validation to be fulfilled. When an operator makes a request to validate a digital certificate, the client processor 15 just needs to query the local storage device 17 to retrieve the desired certificate validation results. The result is a more efficient process since the operator can obtain certificate validation results without having the client processor 15 be continuously connected in communication with the host processor 13. The resources of the client processor 15 need not be tied up in making a connection to the host processor 13 each time a request is made to validate a digital certificate. Since validation results are stored local to the first client 14 and the first client 14 does not need to perform a validation process on certificates, the performance of the first client 14 is improved.

Although the above description describes that the predetermined amount of time elapsed is the amount of time in a regular business day, it is conceivable that the predetermined amount of time elapsed may be a different amount of time. As another example, the predetermined amount of time elapsed may be the amount of time in a regular business week.

Also, although the above description describes a human operator making a request via the user interface 16 to validate a digital certificate, it is conceivable that the request or multiple requests could be received in an automated stream from an external source without any human intervention.

Also, although the above description describes the certificate validation program 32 as being a single program, it is conceivable that two or more separate programs could comprise the certificate validation program.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A distributed digital certificate validation method between a host and a client connectable in communication with the host, the method comprising:
   making a first connection with the host by the client to establish data communication with the host;
   sending to the host a request for a digital certificate validation result by the client;
   importing from the host a file containing at least the requested digital certificate validation result by the client;
   storing the imported file in a local storage device accessible to the client for later retrieval of at least the requested digital certificate validation result from the local storage device by the client;
   querying the local storage device to retrieve the requested digital certificate validation result in response to a need by the client to validate the certificate when the host is not connected to the client, wherein the communication connection between the host and the client is disconnected after the file has been transmitted from the host to the client; and
   wherein another communication connection is established between the host and the client after elapse of at least a predetermined time period since making the last connection with the host was made.

2. A distributed digital certificate validation method between a client and a host connectable in communication with the client, the method comprising:
   establishing data communication with the client by the host;
   receiving from the client a pre-validation request for certificate validation results by the host;
   executing a certificate validation program by the host to obtain certificate validation results based upon at least the pre-validation request received from the client;
   transferring by the host a pre-validation file containing the requested certificate validation results to local storage accessible to the client for later certificate validation by the client when the host is not connected to the client;
   disconnecting from the client by the host, wherein the communication connection between the host and the client is disconnected after the pre-validation file has been transmitted from the host to the client; and
   wherein another communication connection is established between the host and the client after elapse of at least a predetermined time period since making the last connection with the host was made.

3. A distributed digital certificate validation system comprising:
   a host including a host processor for executing a certificate validation program; and
   a plurality of clients remote from the host, each client being connectable in data communication with the host to make a request for a certificate validation result;
   wherein the host (i) executes the certificate validation program to provide certificate validation results based upon the request from a particular client, and (ii) transmits to the particular client a file containing the requested certificate validation results;

wherein the particular client (i) stores the file containing the requested certificate validation results in local storage accessible to the particular client, and (ii) retrieves the file certificate validation results from the local storage at a later time when the host is not connected to the particular client to validate a particular certificate, wherein the communication connection between the host and the particular client is disconnected after the file has been transmitted from the host to the particular client; and wherein another communication connection is established between the host and the particular client after elapse of at least a predetermined time period since making the last connection with the host was made.

4. A distributed digital certificate validation method according to claim 1, wherein the request for a digital certificate validation result by the client is part of a request for validation results for multiple digital certificates and said file includes the multiple digital certificates and corresponding validation results therefor.

5. A distributed digital certificate validation method according to claim 4, wherein the multiple digital certificates meet an Internet X.509 public key infrastructure profile.

6. A distributed digital certificate validation method according to claim 4, wherein subsequent to querying the local storage device to retrieve the requested certificate validation result, a further certificate validation result is requested from the local storage device prior to reconnecting to the host.

7. A distributed digital certificate validation method according to claim 6 further comprising:

determining if a predetermined time has passed since said file including the multiple digital certificates has been downloaded.

8. A distributed digital certificate validation method according to claim 7 wherein the predetermined time period since making the last connection with the host is a business day.

* * * * *